United States Patent [19]
Watari et al.

[11] Patent Number: 4,592,085
[45] Date of Patent: May 27, 1986

[54] SPEECH-RECOGNITION METHOD AND APPARATUS FOR RECOGNIZING PHONEMES IN A VOICE SIGNAL

[75] Inventors: Masao Watari; Makoto Akabane, both of Saitama; Hisao Nishioka, Chiba; Toshihiko Waku, Tokyo, all of Japan

[73] Assignee: Sony Corporation, Tokyo, Japan

[21] Appl. No.: 469,114

[22] Filed: Feb. 23, 1983

[30] Foreign Application Priority Data

Feb. 25, 1982 [JP] Japan ................... 57-29471

[51] Int. Cl.$^4$ .............................................. G10L 1/00
[52] U.S. Cl. ..................................................... 381/43
[58] Field of Search ................... 381/41–50; 364/573.5

[56] References Cited

U.S. PATENT DOCUMENTS 3,265,814 8/1966 Maeda et al. ...................... 381/43
4,412,098 10/1983 An ....................................... 381/43
4,454,586 6/1984 Pirz et al. ............................ 381/41

Primary Examiner—E. S. Matt Kemeny
Attorney, Agent, or Firm—Lewis H. Eslinger; Alvin Sinderbrand

[57] ABSTRACT

Phoneme recognition uses the silence-phoneme and phoneme-phoneme transition spectral information rather than the phoneme information itself. The transition detector features first and second differences in level for each frequency band.

28 Claims, 25 Drawing Figures

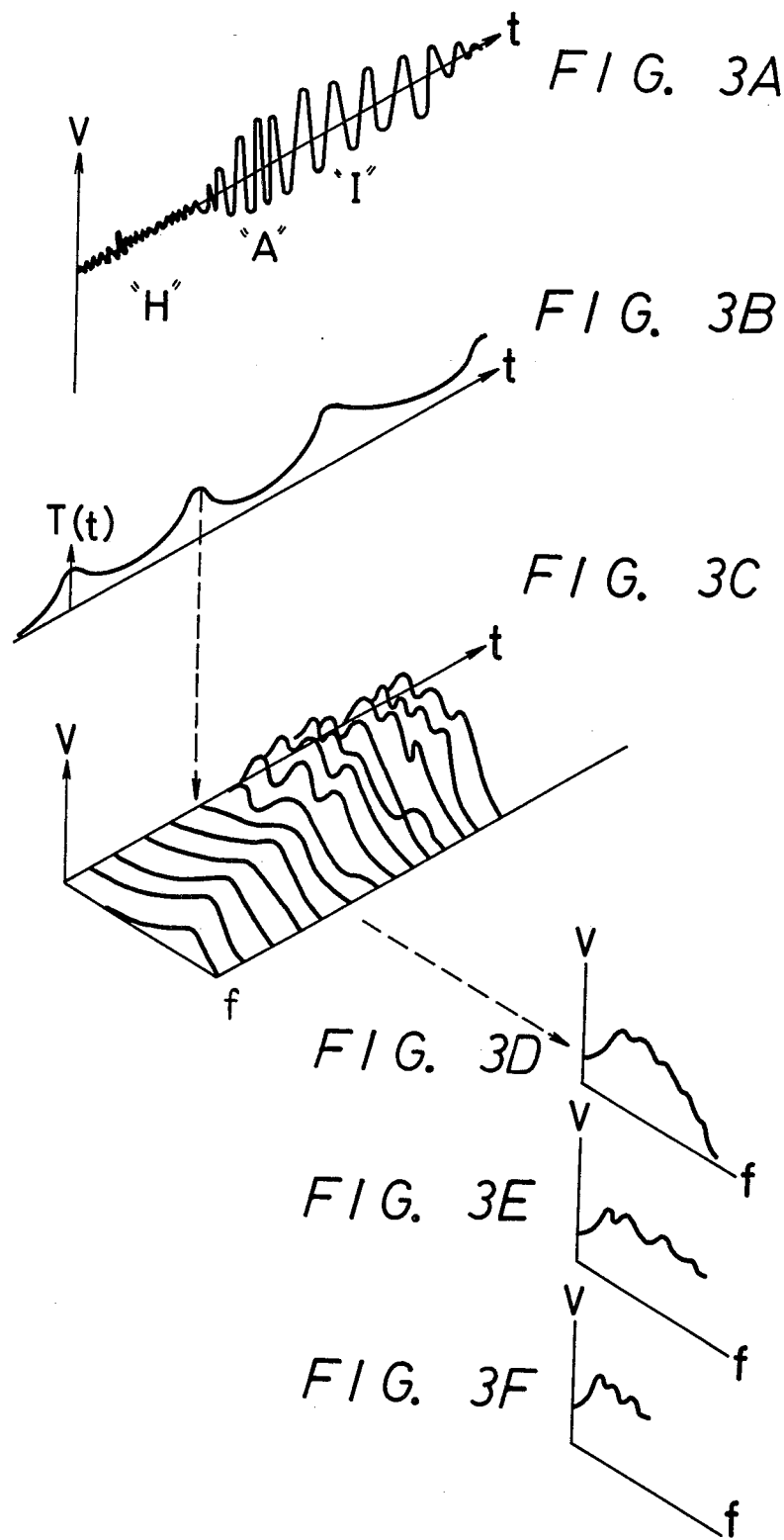

| Utterance | Phoneme | | | | | |
|---|---|---|---|---|---|---|
| HAI (YES) | *→H | H→A | A→I | I→* | | |
| IIE (NO) | *→I | I→E | E→* | | | |
| ZERO (ZERO) | *→Z | Z→E | E→R | R→O | O→* | |
| ICHI (ONE) | *→I | I→* | *→CH | CH→I | I→* | |
| NI (TWO) | *→N | N→I | I→* | | | |
| SAN (THREE) | *→S | S→A | A→N | N→* | | |
| YON (FOUR) | *→Y | Y→O | O→N | N→* | | |
| GO (FIVE) | *→G | G→O | O→* | | | |
| ROKU (SIX) | *→R | R→O | O→* | *→K | K→U | U→* |
| NANA (SEVEN) | *→N | N→A | A→N | N→A | A→* | |
| HACHI (EIGHT) | *→H | H→A | A→* | *→CH | CH→I | I→* |
| KYU (NINE) | *→K | K→Y | Y→U | U→* | | |

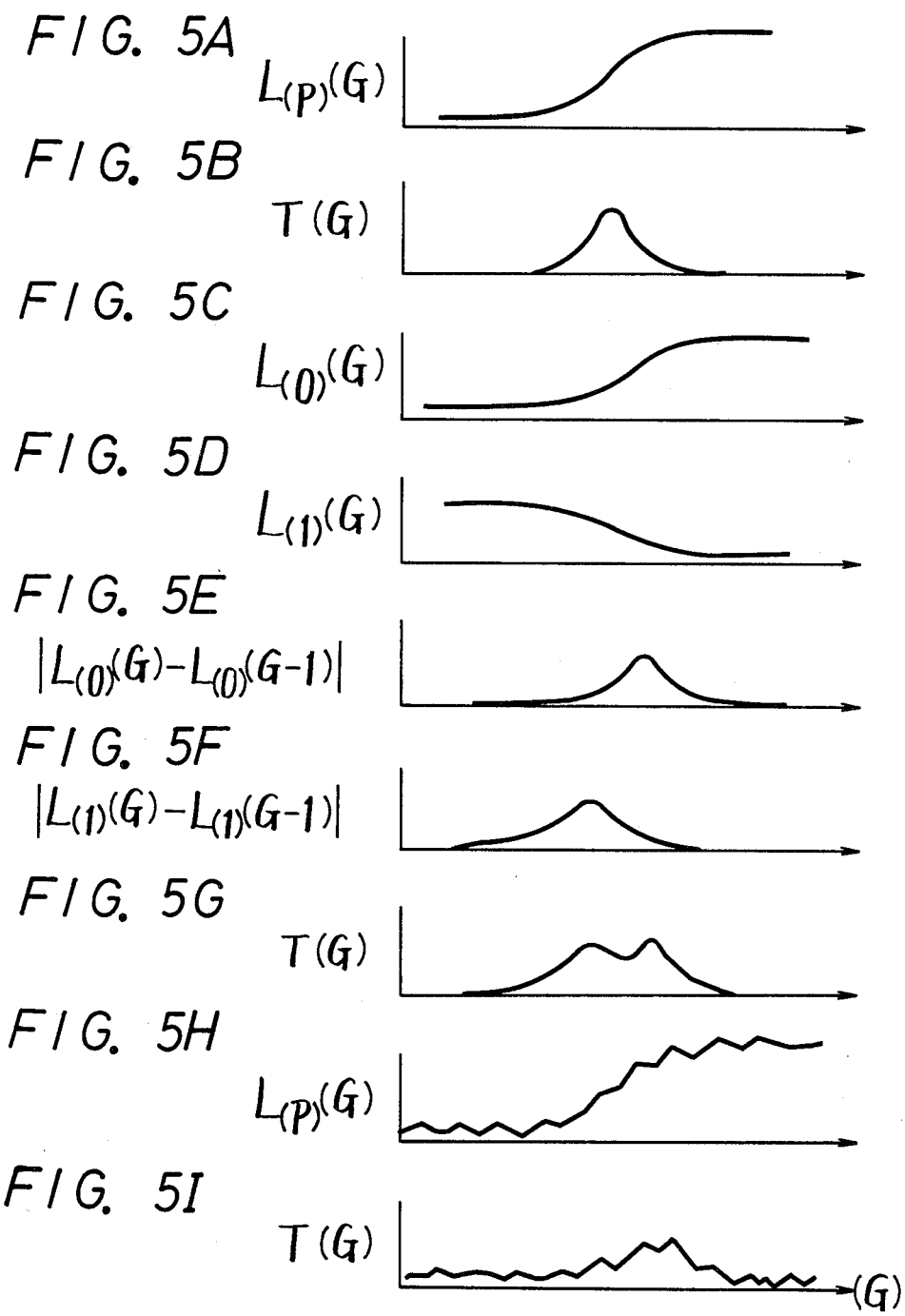

SPEECH-RECOGNITION METHOD AND APPARATUS FOR RECOGNIZING PHONEMES IN A VOICE SIGNAL

BACKGROUND OF THE INVENTION

1. Field of the Invention

This invention generally relates to a speech-recognition method and apparatus and, more particularly, to such a method and apparatus capable of recognizing particular phonemes in a voice signal regardless of the speaker.

2. Description of the Prior Art

Known speech-recognition apparatus can recognize phonemes uttered by a particular speaker. In using that type of apparatus the speaker utters a list of all words to be recognized and acoustic parameters of the words are detected by various circuit elements, such as a bandpass filter bank, and stored in a memory. Then, when that speaker later uses the same words in normal speech, their acoustic parameters are detected, compared with the previously stored acoustic parameters and, when the acoustic parameters of both coincide, the apparatus "recognizes" the later-spoken words. To cope with a situation in which the speaker might talk faster or slower at different times (for example, the speaker might talk slower when listing the words than in normal speech) a time series of the acoustic parameters can be extracted at regular intervals, for example every 5 to 20 msec, and used in recognizing the words.

The foregoing type of apparatus must register and store in advance all acoustic parameters of all words to be recognized, and thus requires enormous storage capacity and must perform a great many mathematical calculations. The "time matching" function, for example, requires myriad mathematical calculations and taxes the abilities of most data processors. If the time bases are not sufficiently matched, recognition might be faulty.

Another voice-recognition method has been proposed which is capable of recognizing individual phonemes, for example, the sounds A, I, U, E, 0, K, S, T, etc., and the syllables KA, KI, KU, etc.

A principal drawback of the last mentioned method is that, while phonemes such as vowels and the like with quasi-stationary portions can be easily recognized, phonemes with short phonemic characteristics, such as plosives (K, T, P and so on), are extremely difficult to organize into phonemes using acoustic parameters.

To overcome that difficulty, a refinement of the method has been proposed that involves storing the phonemes that are discretely uttered. The phonemes that are diffusively uttered are recognized by matching their time bases using "time matching" techniques similar to those described above, whereby the phonemes with short phonemic characteristics such as the aforesaid plosives (K, T, P and so on), can be more readily recognized. However, that method also has limited utility because of the large number of mathematical calculations required to match time bases. Furthermore, when that method is used to recognize phonemes of anyone, rather than just a particular speaker, the properties of the acoustic parameters are so scattered due to individual differences in speech that the recognition of phonemes is virtually impossible merely by matching the time bases as described above.

Accordingly, still other methods have been proposed. One such other method stores a plurality of acoustic parameters that could represent a word and then recognizes phonemes on the basis of approximate matches of those acoustic parameters. Another method converts a whole word to parameters of fixed dimensions and then evaluates or discriminates among them using a discriminatory function. But, those methods, like the others earlier mentioned, require large amounts of storage capacity and great numbers of mathematical calculations, which reduces considerably the number of words that can be recognized.

One property of voice signals is the existence in them of transitions--the points at which one phoneme changes to another and at which a silence becomes a phoneme or vice versa. Methods of detecting those transitions are known, but no known prior art method or apparatus has been proposed for effectively and efficiently using the transitions for speech recognition.

OBJECTS AND SUMMARY OF THE INVENTION

Accordingly, an object of this invention is to provide a method and an apparatus for recognizing particular phonemes in a voice signal and which are capable of overcoming the defects of prior art methods and apparatus.

Another object of this invention is to provide a method and an apparatus for recognizing particular phonemes in a voice signal, which method and apparatus easily and certainly recognize particular phonemes without compressing or expanding time series of acoustic parameters to match the time bases thereof and which do not require a previous utterance of the words to be recognized.

A further object of this invention is to provide a method and an apparatus for recognizing particular phonemes in a voice signal that requires less storage capacity than prior art methods and apparatus without restricting the number of words that can be recognized.

Yet another object of this invention is to provide a method and an apparatus, as aforesaid, that detects transitons in the voice signal to enable use of the phonemic information at the transitions for recognizing the phonemic information in the voice signals.

A still further object of this invention is to provide a method and an apparatus for generating, from an acoustic parameter signal containing phonemic information of a voice signal transition signal, that can be evaluated to indicate the location in the voice signal of a silence-phoneme or phoneme-phoneme transition.

In accordancce with one aspect of this invention, for recognizing particular phonemes in a voice signal having silence-phoneme and phoneme-phoneme transitions, an electrical signal is provided representing the voice signal and a first acoustic parameter signal is produced from the electrical signal so as to contain phonemic information of the voice signal; a transition signal is generated from the phonemic information in the first acoustic parameter signal to indicate the location in the voice signal of a transition; the first acoustic parameter signal is stored and a second acoustic parameter signal is produced from the stored first acoustic parameter signal, using the transition signal, so that the second acoustic parameter signal contains phonemic information of the voice signal at the transition, whereby the second acoustic parameter signal can be compared with known phonemic information to recognize the phonemic information in the voice signal.

In accordance with another aspect of the invention, a transition in a voice signal having silence-phoneme and phoneme-phoneme transitions is detected by providing an acoustic parameter signal containing phonemic information of the voice signal; separating a plurality of time frames of the acoustic parameter signal into a plurality of frequency band signals, each of which frequency band signals represents a power level of the acoustic parameter signal in a particular frequency band and time frame; calculating an average power level at each time frame from the frequency band signals; and calculating a plurality of first difference levels, between the average power level at each time frame and the plurality of power levels at the same time frame. Then, there are calculated, for all freqeuncy bands, a plurality of second difference levels between: (1) the lowest of the difference levels in each frequency band for the plurality of time frames and (2) each first difference level in the same frequency band for the plurality of time frames, and the sum of all of the second difference levels is then calculated, with that sum comprising a transition signal which can be evaluated to detect transitions in the voice signal.

The above, and other objects, features and advantages of the present invention will become apparent as the invention, is described by referring to the accompanying drawings, in which like numerals and symbols indicate like features throughout.

BRIEF DESCRIPTION OF THE DRAWINGS

FIGS. 3A to 3H are diagrams representing various signals generated by the apparatus shown in FIG. 2;

FIG. 4 is a table that illustrates how the method of this invention works generally;

FIGS. 5A to 5I are graphs used to explain a prior art transition detection method;

FIG. 6 is a block diagram schematically showing a circuit used in the apparatus shown in FIG. 2 for generating silence-phoneme and phoneme-phoneme transition signals.

DESCRIPTION OF THE PREFERRED EMBODIMENT

Figure 1:
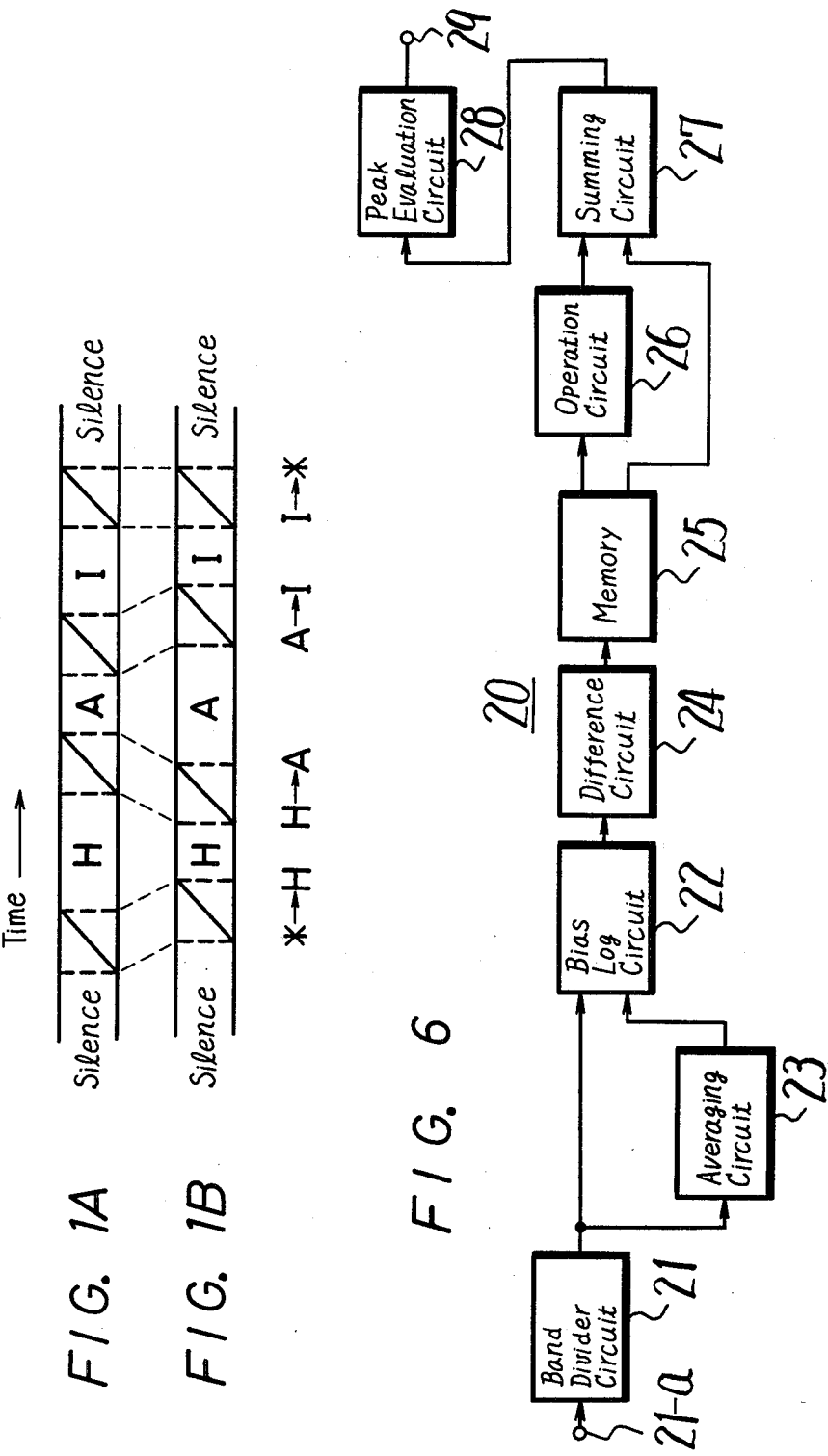
FIGS. 1A and 1B are diagrams showing the changes of phonemes in a voice signal that form the basis of the speech-recognition method and apparatus of this invention.

The voice-recognition method and apparatus in accordance with this invention takes advantage of an inherent property of speech. In general, we pronounce with long stress phonemes such as vowels and fricatives (S, H and so forth). The utterance of, for example, "HAI" ("yes" in Japanese), this sound comprises "silence→H→A→I→silence" as shown diagrammatically in FIG. 1. (The symbol "*" indicates a silence and "→" indicates a transition, whether it be a silence-phoneme or a phoneme-phoneme transition.) We can utter the same word "HAI" either as shown in FIG. 1A or FIG. 1B. FIG. 1 reveals that each quasi-stationary portion or segment formed by the phonemes H, A and I, has a duration that can vary with each utterance. However, a silence-phoneme transition or phoneme-phoneme transition (the portion or segment between the quasi-stationary portions shown in FIGS. 1A and 1B by an oblique line) has a duration which changes very little with each utterance. That is, each time the word is spoken, the time base of the quasi-stationary segment can fluctuate, but the time base of the transitions is relatively constant.

Figure 2:
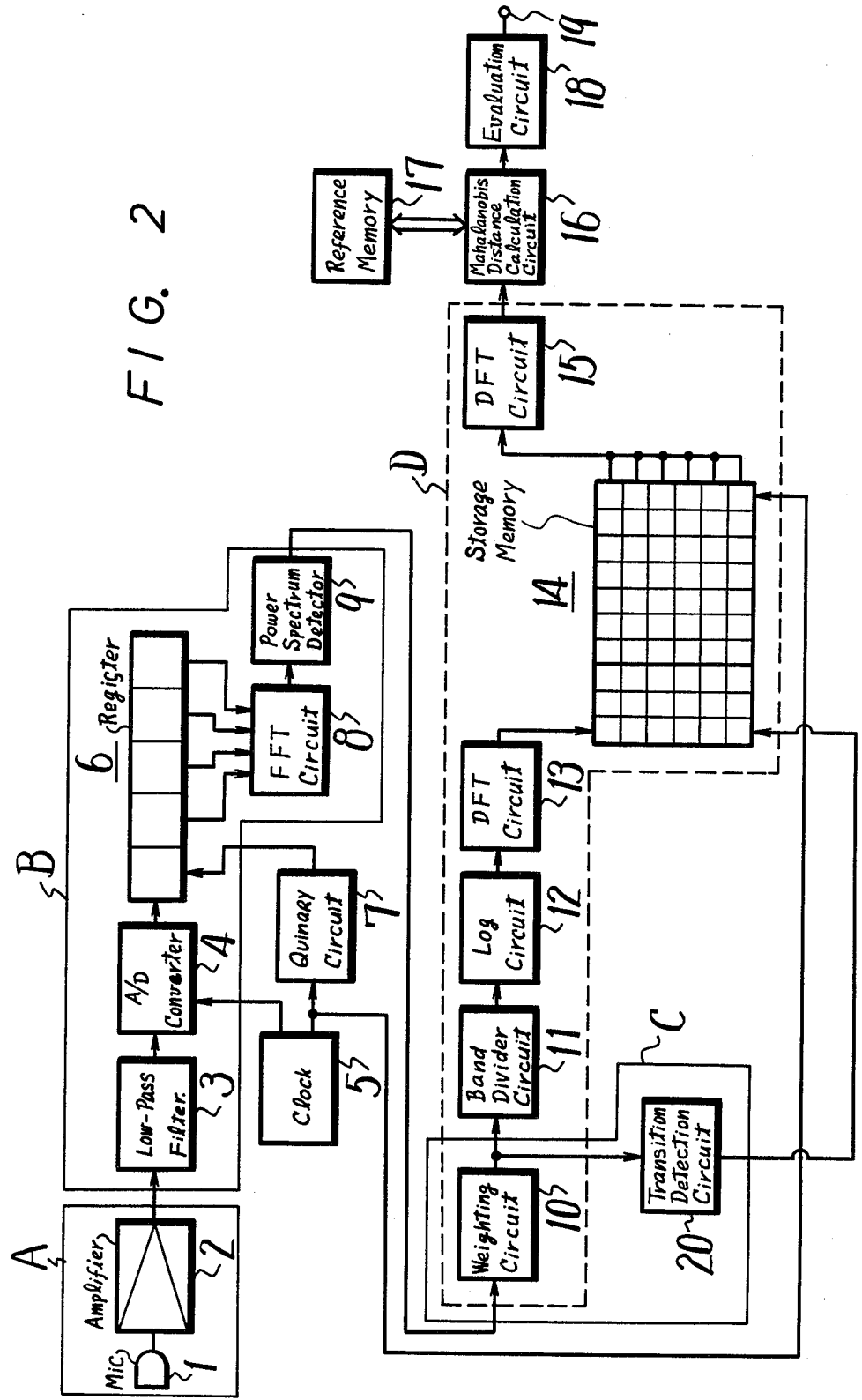
FIG. 2 is a block diagram schematically showing a voice-recognition apparatus according to one embodiment of this invention.

An apparatus using that property of speech for recognizing particular phonemes in a voice signal according to an embodiment of this invention is shown in FIG. 2. In FIG. 2 a solid-line block A represents a device to convert a voice signal into an electrical signal representative of the voice signal, and comprises a microphone 1 and a microphone 2. A solid-line block B comprises a low-pass filter 3, an analog-to-digital (A/D) converter 4, a shift register 6, a fast-Fourier-transform (FFT) circuit 8 and a power spectrum detector 9, and functions to produce a first acoustic parameter signal, which contains phonemic information of the voice signal, from the electrical signal provided by the section or device A. A solid-line block C is shown to include an emphasis or weighting circuit 10 and a transition detection circuit 20. The detection circuit 20 generates a transition signal that indicates the location of a silence-phoneme transition or a phoneme-phoneme transition in the voice signal using the phonemic information in the first acoustic parameter, which signal has been weighted by the circuit 10. A broken-line block D constitutes a circuit which comprises the emphasis circuit 10, a first band divider circuit 11, a logarithm circuit 12, a first discrete Fourier-transform (DFT) circuit 13, a storage memory 14 and a second DFT circuit 15. The circuit D produces a second acoustic parameter signal from the first acoustic parameter signal by using the transition signal from the detection circuit 20. The second acoustic parameter signal contains phonemic information of voice the signal at the transitions.

In operation, a signal from microphone 1 is fed through microphone amplifier 2 and low-pass filter 3, having a frequency of less than 5.5 kHz, to A/D converter 4. A sampling signal of 12.5 kHz (which occurs with an interval of 80 μsec) is supplied from a clock generator 5 to the A/D converter 4, whereby the voice signal is converted, at the timing of this sampling clock, into a digital signal. The converted digital voice signal is supplied to shift register 6 of 5×64 words, and a frame clock signal, with an interval of 5.12 msec, is supplied from the clock generator 5 to a quinary-counter 7. The count value is supplied to the register 6 and thereby the voice signal is shifted by 64 words each, thus producing from the register 6 a shifted voice signal of 4×64 words.

The signal of 4×64 (=256) words derived from the register 6 is supplied to the FFT circuit 8. In the FFT circuit 8, if it is assumed that a waveform function, represented by $n_f$ sampling data contained in a length of time T, is $$U_{n_fT}(f) \tag{1}$$

then Fourier-transforming the waveform function $U_{n_fT}(f)$ gives a signal expressed as:

$$U_{n_fT}(f) = \int_{-T/2}^{T/2} U_{n_fT}(f)e^{-2\pi jft}dt \tag{2}$$

-continued
$$\equiv U_{1nf}T(f) + jU_{2nf}T(f) \quad (3)$$

The signal from the FFT circuit 8 is supplied to the power spectrum detector 9, from which is produced a power spectrum signal expressed as:

$$|U^2| = U_{1nf}{}^2T(f) + U_{2nf}{}^2T(f) \quad (4)$$

Since the Fourier-transformed signal is symmetrical with respect to the frequency axis, half of the $n_f$ sampling data resulting from the Fourier-transformation are redundant and can be disregarded, resulting in the provision of $\frac{1}{2}n_f$ data. That is, the signal of 256 words fed to the aforementioned FFT circuit 8 is converted and then generated as a power spectrum signal of 128 words. The power spectrum signal comprises the first acoustic parameter signal and it contains the phonemic information of the voice signal necessary to accomplish voice recognition in accordance with the present invention.

The power spectrum signal of 128 words is supplied to the emphasis or weighting circuit 10, in which it is weighted to correct it in an auditory sense. For example, the power spectrum signal might be weighted to emphasize the high frequency component of the voice signal to insure that the the phonemic information therein is properly represented for carrying out the rest of the voice recognition method. In other words, the weighting circuit 10 selectively weights the power level of the first acoustic parameter signal to more accurately represent the phonemic information in the voice signal.

The weighted signal is supplied to first banddivider circuit 11 and thereby divided into, for example, 32 bands corresponding to a frequency mel-scale tailored to the auditory characteristics of the voice signal. When the bands provided by band divider circuit 11 do not coincide with the points representing the 128 words of the power spectrum signal, the signal at the non-coincident points is placed in adjacent bands on a pro-rata basis to make as accurate as possible the representation in 32 bands of the information in the 128-word signal. In any case the power spectrum signal of 128 words is compressed into a signal of 32 words.

That compressed signal is then supplied to logarithm circuit 12 in which it is converted to the logarithm of each band. Thus, there is excluded any redundancy in the power spectrum signal, for example, due to the weighting in the emphasis circuit 10. The logarithm of the power spectrum $$\log|U_{nf}{}^2T(f)| \quad (5)$$

comprises a spectrum parameter $x_{(i)}$ (i=0, 1, ..., 31) which is supplied to first DFT circuit 13. In this case, if the number of the divided bands is taken as M, the first DFT circuit 13 performs the discrete-Fourier-transformation of 2M-2 points with the M-dimensional parameter $x_{(i)}$ (i =0, 1, ..., M-1) being taken as real-number, symmetrical parameters at 2M-1 points. Thus, $$X_{(m)} = \sum_{i=0}^{2M-3} x_{(i)} W_{2m-2}^{mi} \quad (6)$$

where $$W_{2m-2}^{mi} = e^{-j(\frac{2\pi \cdot i \cdot m}{2M-2})} \quad (7)$$

-continued
$$m = 0, 1, \ldots, 2M - 3$$

Furthermore, since the function by which this discrete-Fourier-transformation is performed is regarded as as even function:

$$W_{2M-2}^{mi} = \cos\left(\frac{2\pi \cdot i \cdot m}{2M-2}\right) = \cos\frac{\pi \cdot i \cdot m}{M-1} \quad (8)$$

which yields $$X_{(m)} = \sum_{i=0}^{2M-3} k_{(i)}\cos\frac{\pi \cdot i \cdot m}{M-1} \quad (9)$$

Acoustic parameters representing an envelope characteristic of the power spectrum are extracted by this first discrete-Fourier-transformation operation.

As for the spectrum parameter $x_{(i)}$ thus DFT-operated, the values of P dimensions from 0 to P−1 (for example, P=8) are extracted therefrom and, taking them as local parameters $L_{(p)}$ (p−0, 1, ..., P−1):

$$L_{(p)} = \sum_{i=0}^{2M-3} x_{(i)}\cos\frac{\pi \cdot i \cdot p}{M-1} \quad (10)$$

Here, since the spectrum parameter is symmetrical, assuming $$X_{(i)} = x_{(2M-i-2)} \quad (11)$$

the local parameters $L_{(p)}$ can be expressed $$L_{(p)} = X(\phi) + \sum_{i=1}^{m-2} x(i)\left[\cos\frac{\pi \cdot i \cdot p}{M-1} + \cos\frac{\pi(2M-2-i)p}{M-1}\right] + X(M-1)\cos\frac{\pi \cdot P}{M-1} \quad (12)$$

where p=0, 1, ..., P−1. In this way, the signal of 32 words from the first band divider 11 is further compressed to P (for example, 8) words. The local parameters $L_{(p)}$ comprise a third acoustic parameter signal obtained by converting said first acoustic parameter signal into fewer frequency band signals.

The local parameters $L_{(p)}$ are supplied to the storage memory 14 which comprises a matrix of memory sections of, for example, 16 rows, one row of which is formed of P words in which the local parameters $L_{(p)}$ are stored in turn at every dimension, and to which the frame clock signal, at an interval of 5.12 msec, is supplied from clock generator 5. The parameter at each row is thereby shifted in turn in the lateral direction. Thus, the storage memory 14 stores the local parameters $L_{(p)}$ of P dimensions, with an interval of 5.12 msec in 16 frames (81.92 msec), and the local parameters $L_{(p)}$ are updated by the frame clock.

Meanwhile, the signal from emphasis circuit 10 is supplied to transition detection circuit 20 detect the locations of the transitions between phonemes and between silences and phonemes.

A transition signal $T_{(t)}$, which indicates the location in the voice signal of a transition, is supplied from circuit 20 to storage memory 14 by which, at the time when the local parameter $L_{(p)}$ corresponding to the timing of the transition signal is shifted to the 8th row, storage memory 14 is read out. In the reading of storage memory 14, the signals of 16 frames are read out in the lateral direction at every dimension P, and the signals thus read out are supplied to second DFT circuit 15.

The second DFT circuit 15 performs a DFT (discrete-Fourier-transformation, similarly to the first DFT circuit 13. Thus, the envelope characteristic of the series changes of the acoustic parameters is extracted. Values of Q dimensions, from 0 to Q−1 (for example, Q=3), are derived from the DFT signals from second DFT circuit 15. This second DFT is performed at every dimension P to form transition parameters $K_{(p,q)}$ (p=0, 1, ..., P−1, and q=0, 1, Q−1) of P×Q (=24) words in total, where, since $K_{(0,0)}$ represents the power of the voice waveform, for the purpose of power normalization, when p=0, q=1 to Q may be obtained.

Figures 3G, 3H, 4:
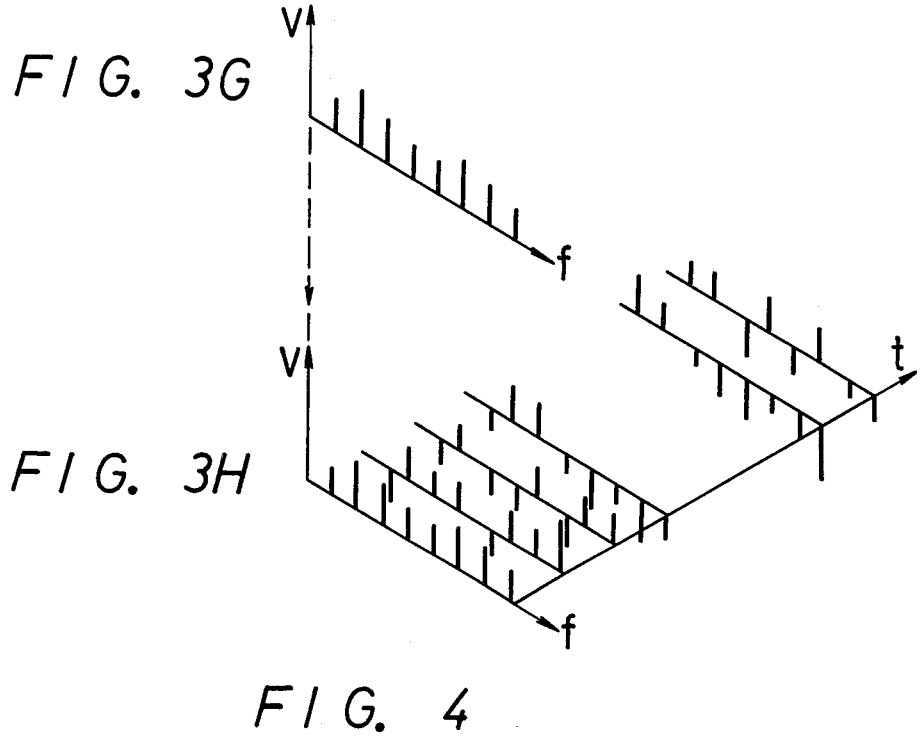

FIGS. 3A to 3H show the various signals obtained in the illustrated apparatus according to this invention. FIG. 3A shows the voice signal waveform for the utterance "HAI" as it is generated by amplifier 2. FIG. 3B shows generally the configuration of the transition signal generated by circuit 20. The overall power spectrum of the voice signal in FIG. 3A is shown in FIG. 3C, which represents the information contained in the first acoustic parameter signal. As an example, the power spectrum of the transition of "H→A" is shown in FIG. 3D. The weighted signal is shown in FIG. 3E. FIG. 3F shows that signal compressed on a mel-scale basis, which signal is discretely Fourier-transformed to become the signal shown in FIG. 3G, and, when the front and rear 16 time frames thereof are matrixed, to become that shown in FIG. 3H. The second discrete-Fourier-transformation in the direction of a time base, or axis t, then produces the transition parameters $K_{(p,q)}$ comprising the second acoustic parameter signals that contain phonemic information of the voice signal at the transitions.

The transition parameters $K_{(p,q)}$ are supplied to a Mahalanobis distance calculation circuit 16 and a cluster coefficient from a reference memory 17 is also supplied to the Mahalanobis distance calculation circuit 16 in which the Mahalanobis distance, with each of the cluster coefficients, is calculated. The cluster coefficients result from generating transition parameters from the utterances of plural speakers with an apparatus similar to that already described, classifying the transition parameters in response to the contents of the phoneme, and then statistically analyzing the same.

The calculated Mahalanobis distance is supplied from circuit 16 to an evaluation circuit 18 that determines the particular transitions represented by the respective transition parameters. That information is then fed to an output terminal 19.

To be more concrete, with respect to the 12 words of, for example, "HAI", "IIE" and "0(ZERO)" to "9(KYU)", the voices of a number of speakers (preferably more than 100 persons) are supplied in advance to an apparatus to detect the nature of the transitions in their speech and generate the transition parameters for those words. Those transition parameters are classified as in the table as, for example, shown in FIG. 4 and then statistically analyzed for every classification or cluster.

For an arbitrary sample $R_{r,n}^{(a)}$(r=1, 2, ..., 24, and a represents the cluster index; for example, a=1 corresponds to *→H and a=2 corresponds to H→A ; and n represents the speaker's number), a covariance matrix $$A_{r,s}^{(a)} = E(R_{r,n}^{(a)} - R_r^{(a)})(R_{s,n}^{(a)} - R_s^{(a)}) \tag{13}$$

is calculated, in which $R_r^{(a)} = E(R_{r,n}^{(a)})$ and E represents an ensemble average. Then, an inverse matrix thereof $$B_{r,s}^{(a)} = (A_{r,n}^{(a)})^{-1}_{r,s} \tag{14}$$

is searched for.

Thus, the distance betwen an arbitrary transition parameter $K_r$ and a cluster a is obtained according to a Mahalanobis distance as $$D(K_{r,a})^d = \sum_{rs}\sum (k_r - \overline{R_r^{(a)}}) \cdot B_{r,s}^{(a)} \cdot (K_r - \overline{R_s^{(a)}}) \tag{15}$$

Accordingly, if the aforesaid $B_{r,s}^{(a)}$ and $R_r^{(a)}$ are searched for and then memorized or stored in the reference memory 17, the Mahalanobis distance between the arbitrary transsition parameter of the input voice signal and the cluster is calculated by the Mahalanobis distance calculation circuit 16.

Thus, the Mahalanobis distance calculation circuit 16 produces the minimum distance from every transition of the incoming voice to each cluster. The order of the transitions are then supplied to evaluation circuit 18 to perform the recognition and evaluation when the input voice stops. For example, at every word, the word distance is calculated by the mean value of the square root of the minimum distance between the respective transition parameters and the clusters. In case the transitions are dropped in part, the apparatus searches a plurality of types of transitions that might fit into the area that has been dropped. However, words with a transition order different from the table are rejected. Then, the word with the minimum word distance is recognized and evaluated.

Hence, with this invention, because the change of the phonemes at the transitions is detected, time-base fluctuations are not a factor in recognizing phonemes and the phonemes of any speaker can be recognized satisfactorily. Moreover, since parameters are generated at the transitions, as described above, and one transition can be recognized in 24 dimensions, recognition can be carried out with great ease and high precision.

In an experiment with the aforesaid apparatus, 120 speakers provided reference information for 120 words and then other speakers used the same 120 words. A mean recognition rate of 98.2% was achieved.

Further, "H→A" of "HAI" and "H→A" of "8(HA-CHI)", for example, can both be classified into the same cluster. Therefore, the same transition can be applied to the recognition of various words. Thus, a large number of words can be recognized without difficulty. To that end, if the number of phonemes to be recognized is $\alpha$, clusters of about $\alpha P_2$ are calculated and the cluster coefficient is stored in the reference memory 17.

FIG. 6 schematically illustrates an example of the transition detection circuit 20 used in the voice-recognition apparatus according to this invention.

Before describing the method for detecting the transitions as performed by detection circuit 20, brief consideration will be given, with reference to FIGS. 5A-5I, to a prior art method for detecting transitions in a voice signal. That prior method uses the sum of the amounts of change of the local parameters L(p) like those generated by the second DFT circuit 13. That is, when the parameters of P dimensions are abstracted at every time frame, if the parameter of the frame G is taken as $L_{(p)}(G)$ (p=0, 1, .., P−1), the detection of the transitions is performed by utilizing the sum of the absolute value of the difference amount given by $$T(G) = \sum_{p=0}^{P-1} |L_{(p)}G - L_{(p)}(G - 1)| \tag{16}$$

When P is one dimension, as shown in FIGS. 5A and 5B, the peaks of the parameter T(G) are obtained at the points in which the parameters $L_{(p)}(G)$ change. However, when P is two dimensions, if the parameters $L_{(0)}(G)$ and $L_{(1)}(G)$ of zero and one dimension, shown in FIGS. 5C and 5D, change similarly to the above, the difference amounts are respectively changed as shown in FIGS. 5E and 5F. A prior art transition parameter T(G) thus, has two peaks, as in FIG. 5G, and the point of the transition can not be determined. That phenomenon will probably take place any time the parameters of more than two dimensions are taken.

Furthermore, in the above description the parameter $L_{(p)}(G)$ was assumed to be continuous, while it is, in practice, a discrete amount. Moreover, in general, phonemes have fairly small fluctuations so that the parameter $L_{(p)}(G)$ actually changes as shown in FIG. 5H, resulting in a number of peaks and valleys in the parameter T(G), as shown in FIG. 5I.

Therefore, the prior art method of detecting transitions has various defects, namely the inaccuracy of the detection and the instability of the detection level.

In contrast thereto, the transition detection circuit 20 according to this invention detects the transitions with ease and stability.

FIG. 6 shows an arrangement of detection circuit that is particular useful for generating the transition signal T(t) in the voice-recognition apparatus according to the present invention.

The weighted signal from the emphasis circuit 10 of FIG. 2 is supplied through an input terminal 21-a to a second band divider circuit 21 in which successive time frames of this signal are divided, in a manner similar to that performed by first band divider circuit 11, into N (for example, 20) frequency bands on a mel-scale basis. A signal $V_{(n)}$ (n=0, 1, ..., N−1) associated with the signals in the respective bands is thereby produced. In other words the signal graphically represented in FIG. 3C is treated as comprising a plurality of time frames, one of which (at the transition between H and A) is depicted in FIG. 3D. After weighting, the signal at each time frame (see, for example, FIG. 3E) is divided into N frequency bands, each of which therefore comprises a frequency band signal representing a power level of the first acoustic parameter signal in a particular frequency band and time frame.

The signal $V_{(n)}$ is supplied to a bias logarithm circuit 22 to form $$v'_{(n)} = \log(V_{(n)} + B) \tag{17}$$

The signal $V_{(n)}$ is also supplied to an accumulator or averaging circuit 23 in which is formed the following signal:

$$V_{(a)} = \sum_{n=1}^{20} V_{(n)}/20 \tag{18}$$

The signal $V_a$ thus represents the average power level in each time frame. Supplying this average signal $V_a$ to bias logarithm circuit 22 yields:

$$v_a' = \log(V_a + B) \tag{19}$$

Further supplying these signals to a difference circuit 24 gives:

$$v_{(n)} = v_a' - v_{(n)}' \tag{20}$$

The signal $v'_{(n)}$ from difference circuit 24 thus represents a plurality of first difference levels between the average power level in a particular time frame and the plurality of power levels in that same time frame.

By using the logarithm of the signal $V_{(n)}$, changes in the first difference levels from time frame to time frame that result from variations in the speaker's emphasis of different phonemes are minimized. That ensures that the changes in the first difference levels from time frame to time frame in fact represent changing phonemic information in the voice signal rather than changes in the level of the incoming voice signal. Furthermore, because the calculation is performed with the addition of a bias B, it is possible to lower the sensitivity of the circuit to fairly small sound components (noise, etc.) in the incoming signal. In other words sensitivity is reduced because $v'_{(n)}$ approaches zero as B approaches infinity, so that increasing the bias will decrease the circuit's sensitivity to noise.

The parameter $v'_{(n)}$ is supplied to a transition signal memory apparatus 25 in which the of first difference levels for 2w+1 (for example, nine) time frames are stored. The stored signal is supplied to an operation circuit 26 to thereby form a signal as:

$$Y_{n,t} = \min_{I \in GF_N}[v_{(n)}(I)] \tag{21}$$

where $$GF_N = \{I; -w+t \leq I \leq w+t\}$$

Thus, the lowest first difference level for each frequency band (here 20) across the plurality (here nine) of the time frames is determined. In other words there are 20 minimum first difference levels.

Supplying that signal, and the remaining first difference levels from transition memory apparatus 25, to a summing circuit 27 gives:

$$T(t) = \sum_{n=0}^{N-1} \sum_{I=-w}^{w} (v_{(n)}(I + t) - Y_{n,t}) \tag{22}$$

The summing circuit 27 thus provides a sum of a plurality of second difference levels. Each second difference level comprises the difference between the minimum first difference level in a frequency band and each of the other first difference levels in that frequency band. In the present example there are 180 second difference levels (20 frequency bands across nine time frames), and 20 of those second difference levels will be zero. In any case, the sum of the second difference levels is the transition parameter T(t). $T_{(t)}$, the transtion detection parameter, is supplied to a peak evaluation circuit 28, which detects the location of the transitions in the input voice signal. Those locations are indicated to an output terminal 29 and then supplied to the storage means 14 in FIG. 2.

Figures 7A, 7B, 7C:
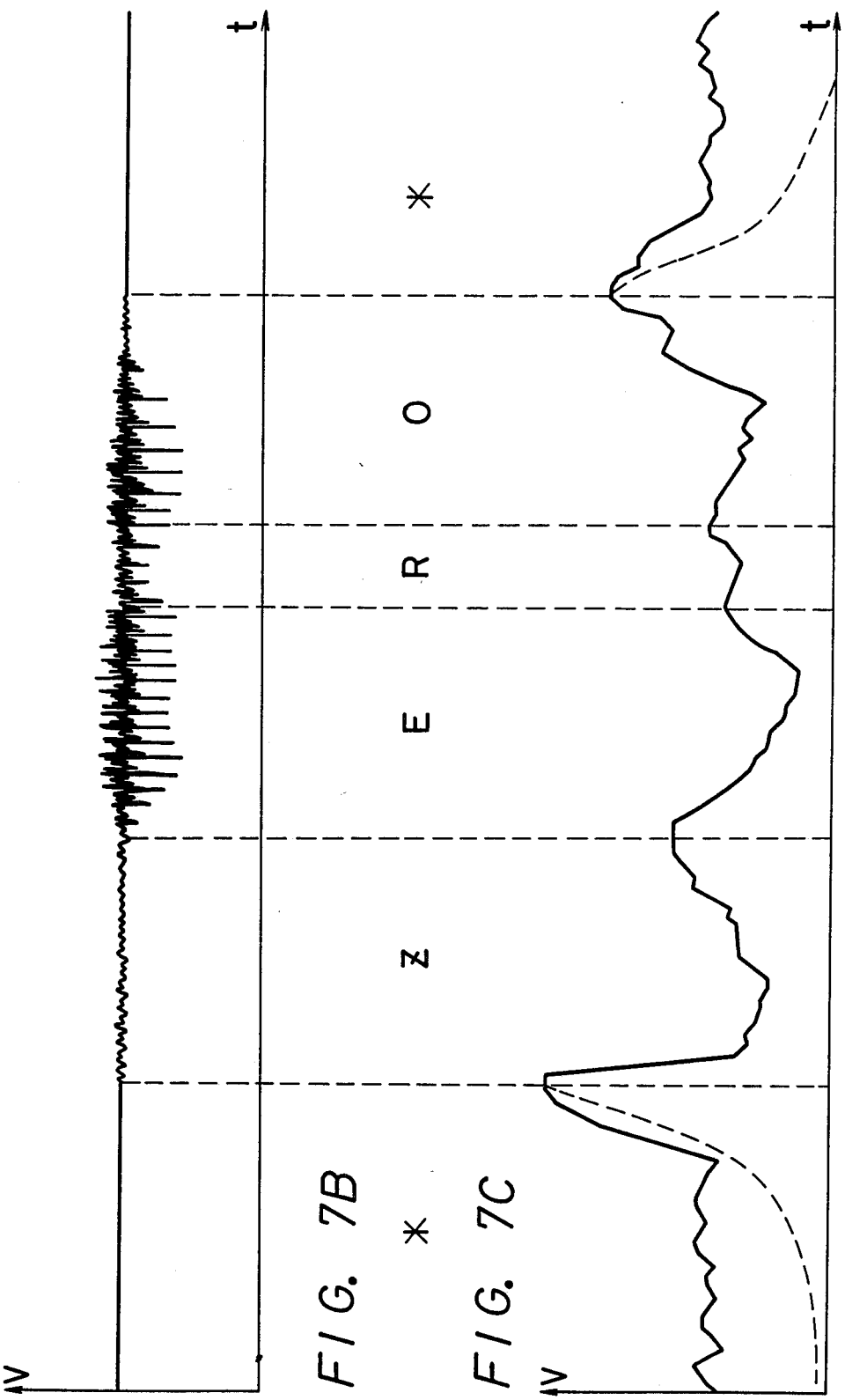
FIGS. 7A-7C are graphs showing the relation among a voice signal waveform, the phonemes and transitions in the voice signal, and the transition signal generated by the circuit shown in FIG. 6.

Since the parameter $T_{(t)}$ is defined by w time frames, the formation of false or multiple peaks is minimized. FIGS. 7A to 7C illustrate the utterance of, for example, "ZERO". A digital signal of 12 bits with a sampling frequency 12.5 kHz has 256 points that are fast-Fourier-transformed at the frame period of 5.12 msec. Transition detection is effected with the band number N being 20, the bias B being zero and the number of time frames, 2w+1, being 9. FIG. 7A shows the voice sound waveforms, FIG. 7B the phonemes and transitions and FIG. 7C transition signal T(t) in which well defined peaks are generated at the respective transitions of "silence→Z", "Z→ E", "E→R", "R→O" and "O→silence". Although some extraneous peaks and valleys are formed during silences, because of background noise, they can be substantially reduced to zero by increasing the bias B, as shown by the broken lines in FIG. 7C.

The peak evaluation circuit 28 locates the transitions in the voice signal by time-sampling the transition signal (T(t). This is best understood by considering the plot of T(t) vs. time in FIG. 7C. The peak evaluation circuit 28 identifies as a transition a maximum T(t) occurring in the middle of a predetermined time interval. T(t) is continuously monitored to detect maxima that occur in the middle of that time interval. If the duration of the time interval is judiciously chosen, only "true" transitions, like those shown in FIG. 7C, will be detected. Smaller peaks between actual transitions will only very infrequently occur in the middle of the time intervals for any sample of T(t) over that interval. Moreover, because phoneme recognition ultimately depends on obtaining the closest match between the phonemic information at the transitions and reference phonemic information, slight and infrequent misidentification of transitions will not significantly affect the rate at which the apparatus shown in FIG. 2 accurately recognizes phonemes in a voice signal.

In this way, the transitions in a voice signal can be detected. Using the transition detection circuit 20 in accordance with this invention, the locations of transitions can be detected independently of differences in emphasis on particular phonemes or level changes in the voice signal.

Moreover, the circuit according to this invention for recognizing particular phonemes in a voice signal is not limited to the above-described method and apparatus, but can also be applied to a case in which the stationary segment between transitions is detected and the time bases of the stationary segments are matched by employing the detected transitions. Furthermore, the transition detection circuit according to this invention can also be effectively utilized for the analysis of the transitions in voice sound synthesis.

Although a particular embodiment of the invention has been described in detail herein with reference to the accompanying drawings, it is to be understood that this invention is not limited to that precise embodiment or the specifically described variations, and that various changes and other modifications can be affected therein by a person skilled in the art without departing from the spirit or scope of the invention which is intended to be defined solely by the appended claims.

What is claimed is:

1. A method for recognizing particular phonemes in a voice signal having silence-phoneme and phoneme-phoneme transitions, said method comprising the steps of:
   providing an electrical signal representing said voice signal;
   producing a first acoustic parameter signal from said electrical signal, said first acoustic parameter signal containing phonemic information of said voice signal;
   generating a transition signal from the phonemic information in said first acoustic parameter signal indicating the location in said voice signal of a transition;
   storing said first acoustic parameter signal; and
   producing a second acoustic parameter signal from said stored first acoustic parameter signal using said transition signal, said second acoustic parameter signal containing phonemic information of said voice signal at said transition, whereby said second acoustic parameter signal can be compared with known phonemic information to recognize the phonemic information in said voice signal.

2. A method for recognizing particular phonemes in a voice signal as in claim 1, wherein said step of producing a first acoustic parameter signal comprises the sub-steps of:
   providing from an analog electrical signal a digital electrical signal representing said voice signal
   storing in turn a plurality of said digital signals in a register means; and
   producing said first acoustic parameter signal from said stored digital signals by Fourier-transforming a plurality of said stored digital signals.

3. A method for recognizing particular phonemes in a voice signal as in claim 1, wherein said step of generating comprises the sub-steps of:
   separating a plurality of time frames of said first acoustic parameter signal into a plurality of frequency band signals, each said frequency band signal representing a power level of said first acoustic parameter signal in a particular frequency band and time frame;
   calculating from said plurality of frequency band signals an average power level at each said time frame;
   calculating for all said time frames a plurality of first difference levels between said average power level at each said time frame and said plurality of power levels at the same time frame;
   calculating for all said frequency bands a plurality of second difference levels between:
   (1) the lowest of said first difference levels in each said frequency band for said plurality of time frames, and
   (2) each said first difference level in the same frequency band across said plurality time frames; and
   calculating the sum of all of said second difference levels, whereby said sum comprises said transition signal which can be evaluated to detect transitions in said voice signal.

4. A method for recognizing particular phonemes in a voice signal as in claim 3, wherein said step of generating further comprises the sub-step of evaluating said transition signal to detect peaks therein by time-sampling said transition signal using a predetermined time interval and identifying as a peak level each maximum of said transition signal occurring in the middle of said time interval to thereby locate transitions in said voice signal.

5. A method for recognizing particular phonemes in a voice signal as in claim 4, wherein each said first difference level is the difference between the logarithm of said respective average power level and the logarithm of said respective power level, whereby the influence on said first difference levels of variations in emphasis from phoneme to phoneme of a particular speaker is minimized.

6. A method for recognizing particular phonemes in a voice signal as in claim 5, wherein a bias is applied to each said average power level and to each said power level prior to calculating the logarithms thereof, whereby the influence on said first difference levels of extraneous noise during silences in the voice signal is minimized.

7. A method for recognizing particular phonemes in a voice signal as in claim 6, wherein said step of generating further comprises the sub-step of selectively weighting said power levels of said first acoustic parameter signal to accurately represent the phonemic information in said voice signal.

8. A method for recognizing particular phonemes in a voice signal as in claim 1, wherein said step of storing comprises the sub-steps of:
  separating said first acoustic parameter signal into a plurality of frequency band signals;
  converting said first acoustic parameter signal into a third acoustic parameter signal comprising fewer frequency band signals and containing the phonemic information in said first acoustic parameter signal; and
  storing said third acoustic parameter signal for use in producing said second acoustic parameter signal from said converted first acoustic parameter signal.

9. A method for recognizing particular phonemes in a voice signal as in claim 8, further including the step of weighting the power level of said first acoustic parameter signal to accurately represent the phonemic information in said voice signal.

10. An apparatus for recognizing particular phonemes in a voice signal having silence-phoneme and phoneme-phoneme transition, said apparatus comprising:
  means for providing an electrical signal representing said voice signal;
  first parameter producing means for producing a first acoustic parameter signal from said electrical signal, said first acoustic parameter signal containing phonemic information of said voice signal;
  generating means for generating a transition signal from the phonemic information in said first acoustic parameter signal, said transition signal indicating the location in said voice signal of a transition;
  storage means for storing said first acoustic parameter signal; and
  second parameter producing means for producing a second acoustic parameter signal from said stored first acoustic parameter signal using said transition signal, said second acoustic parameter signal containing phonemic information of said voice signal at said transition, whereby said second acoustic parameter signal can be compared with known phonemic information to recognize the phonemic information in said voice signal.

11. An apparatus for recognizing particular phonemes in a voice signal as in claim 10, wherein said first parameter producing means comprises:
  means for converting an analog electrical signal of said voice signal to a digital electrical signal;
  register means for storing in turn a plurality of said digital signals; and
  means for producing said first acoustic parameter signal from said stored digital signals by Fourier-transforming a plurality of said stored digital signals.

12. An apparatus for recognizing particular phonemes in a voice signal as in to claim 10, wherein said generating means comprises:
  means for separating said first acoustic parameter signal into a plurality of frequency band signals, each said frequency band signal representing a power level of said first acoustic parameter signal in a particular frequency band and time frame;
  averaging means for calculating from said plurality of frequency band signals an average power level at each said time frame;
  difference circuit means for calculating for all said time frames a plurality of first difference levels between said average power level at each said time frame and said plurality of power levels at the same time frame;
  memory means for storing a plurality of said first difference levels for a plurality of time frames;
  operating circuit means for determining from said stored first difference levels a plurality of minimum first difference levels, each said frequency band having a minimum first difference level for said plurality of time frames; and summing means for calculating the sum of a plurality of second difference levels, each comprising the difference between:
    (1) said minimum first difference level in each said frequency band, and
    (2) each said first difference level in the same frequency band for said plurality of time frames, whereby said sum comprises said transition signal which can be evaluated to detect transitions in said voice signal.

13. An apparatus for recognizing particular phonemes in a voice signal as in claim 12, wherein said generating means further comprises peak evaluation means for evaluating said transition signal to detect peaks therein by time-sampling said transition signal using a predetermined time interval and identifying, as a peak level, each maximum of said transition signal occurring in the middle of a said time interval to thereby locate transitions in said voice signal.

14. An apparatus for recognizing particular phonemes in a voice signal as in claim 13, further comprising log circuit means for calculating the logarithms of said respective average power levels and said respective power levels, and wherein said first difference levels represent the differences between said respective logarithms, whereby the influence on said first difference levels of variations in emphasis from phoneme to phoneme of a particular speaker is minimized.

15. An apparatus for recognizing particular phonemes in a voice signal as in claim 14, wherein said log circuit means includes bias means for applying a bias to each said average power level and to each said power level prior to calculating the logarithms thereof, whereby the influence on said first difference levels of extraneous noise during silences in said voice signal is minimized.

16. An apparatus for electrically recognizing particular phonemes in a voice signal as in claim 15, wherein said generating means further comprises weighting means for weighting said power level of said first acoustic parameter signal to accurately represent the phonemic information in said voice signal.

17. An apparatus for electrically recognizing particular phonemes in a voice signal as in claim 10, wherein said storage means comprises:
means for separating said first acoustic parameter signal into a plurality of frequency band signals;
means for converting said first acoustic parameter signal into a third acoustic parameter signal comprising fewer frequency band signals and containing the phonemic information in said first acoustic parameter signal; and
means for storing said third acoustic parameter signal for use in producing said second acoustic parameter signal from said converted first acoustic parameter signal.

18. An apparatus for recognizing particular phonemes in a voice signal as in claim 11, further comprising weighting means for weighting the power level of said first acoustic parameter signal to accurately represent the phonemic information in said voice signal.

19. A method for generating a transition signal for indicating the location of a transition in a voice signal having silence-phoneme and phoneme-phoneme transitions, the method comprising the steps of:
providing an acoustic parameter signal containing phonemic information of the voice signal;
separating a plurality of time frames of said acoustic parameter signal into a plurality of frequency band signals, each said frequency band signal representing a power level of said acoustic parameter signal in a particular frequency band and time frame;
calculating from said plurality of frequency band signals an average power level at each said time frame;
calculating for all said time frames a plurality of first difference levels between said average power level at each said time frame and said plurality of power levels at the same frame;
calculating for all said frequency bands a plurality of second difference levels between:
(1) the lowest of said first difference levels in each said frequency band for said plurality of time frames, and
(2) each said first difference level in the same frequency band for said plurality of time frames; and
calculating the sum of all of said second difference levels, whereby said sum comprises said transition signal which can be evaluated to detect transitions in said voice signal.

20. A method for generating a transition signal as in claim 19, further comprising the step of evaluating said transition signal to detect peaks therein by time-sampling said transition signal using a predermined time interval and identifying as a peak level each maximum of said transition signal occurring in the middle of a said time interval to thereby locate transitions in said voice signal.

21. A method for generating a transition signal as in claim 20 wherein each said first difference level is the difference between the logarithm of said respective average power level and the logarithm of said respective power level, whereby the influence on said first difference levels of variations in emphasis from phoneme to phoneme of a particular speaker is minimized.

22. A method for generating a transition signal as in claim 21, wherein a bias is applied to each said average power level and each said power level prior to calculating the logarithms thereof, whereby the influence on said first difference levels of extraneous noise during silences in the voice signal is minimized.

23. A method for generating a transition signal as in claim 22 wherein said method further comprises the step of selectively weighting said power levels of said acoustic parameter signal to accurately represent the phonemic information in said voice signal.

24. An apparatus for generating a transition signal that can be evaluated to indicate the location in a voice signal of silence-phoneme and phoneme-phoneme transitions, the apparatus comprising:
means for separating a plurality of time frames of an acoustic parameter signal containing phonemic information of the voice signal into a plurality of frequency band signals, each said frequency band signal representing a power level of said acoustic parameter signal in a particular frequency band and time frame;
averaging means for calculating from said plurality of frequency band signals an average power level at each said time frame;
difference circuit means for calculating for all said time frames a plurality of first difference levels between said average power level at each said time frame and said plurality of power levels at the same time frame;
memory means for storing a plurality of said first difference levels for a plurality of time frames;
operating circuit means for determining from said stored first difference levels a plurality of minimum first difference levels, each said frequency band having a minimum first difference level for said plurality of time frames; and
summing means for calculating the sum of a plurality of second difference levels, each comprising the difference between:
(1) said minimum first difference level in each said frequency band, and
(2) each said first difference level in the same frequency band for said plurality of time frames, whereby said sum comprises said transition signal which can be evaluated to detect transitions in said voice signal.

25. An apparatus for generating a transition signal as in claim 24 wherein said apparatus further comprises peak evaluation means for evaluating said transition signal to detect peaks therein by time-sampling said transition signal using a predetermined time interval and identifying as a peak level each maximum of said transition signal occurring in the middle of a said time interval and to thereby locate transitions in said voice signal.

26. An apparatus for generating a transition signal as in claim 25 further comprising log circuit means for calculating the logarithms of said respective average power levels and said respective power levels, and wherein said first difference levels represent the differences between said respective logarithms, whereby the influence on said first difference levels of variations in emphasis from phoneme to phoneme of a particular speaker is minimized.

27. An apparatus for generating a transition signal as in claim 26, wherein said log circuit means includes bias means for applying a bias to each said average power level and to each said power level prior to calculating the logarithms thereof, whereby the influence on said first difference levels of extraneous noise during silences in said voice signal is minimized.

28. An apparatus for generating a transition signal as in claim 27 wherein said apparatus further comprises weighting means for weighting the power level of said acoustic parameter signal to accurately represent the phonemic information in said voice signal.

* * * * *